United States Patent
Tomita et al.

(10) Patent No.: US 7,159,566 B2
(45) Date of Patent: Jan. 9, 2007

(54) CONTROL METHOD AND APPARATUS FOR DIRECT INJECTION SPARK IGNITED INTERNAL COMBUSTION ENGINE

(75) Inventors: Masayuki Tomita, Kanagawa (JP); Takao Maitani, Kanagawa (JP); Akira Nakajima, Yokohama (JP); Tomoyuki Takeda, Yokohama (JP); Hideaki Takahashi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/238,159

(22) Filed: Sep. 29, 2005

(65) Prior Publication Data

US 2006/0065235 A1  Mar. 30, 2006

(30) Foreign Application Priority Data

Sep. 30, 2004 (JP) .............................. 2004-285590
Oct. 15, 2004 (JP) .............................. 2004-300993
Oct. 18, 2004 (JP) .............................. 2004-302341

(51) Int. Cl.
  *F02P 1/00* (2006.01)
  *F02M 43/00* (2006.01)

(52) U.S. Cl. .................. 123/406.47; 123/304

(58) Field of Classification Search ............ 123/284, 123/285, 294, 299, 304, 305, 406.47, 406.53
See application file for complete search history.

(56) References Cited

U.S. PATENT DOCUMENTS 6,112,716 A  9/2000 Tachibana

| 6,345,499 B1 | 2/2002 | Nishimura et al. |
| 6,745,743 B1* | 6/2004 | Abo et al. ................ 123/295 |
| 2004/0163379 A1 | 8/2004 | Pott et al. |
| 2005/0161018 A1 | 7/2005 | Tomita |
| 2005/0161202 A1 | 7/2005 | Tomita |
| 2006/0000440 A1 | 1/2006 | Kohler et al. |
| 2006/0016425 A1* | 1/2006 | Kono et al. ................ 123/305 |
| 2006/0016431 A1* | 1/2006 | Mashiki et al. ............ 123/431 |

FOREIGN PATENT DOCUMENTS

| DE | 103 05 941 A1 | 8/2004 |
| EP | 1 158 150 A2 | 11/2001 |
| JP | 3325230 B2 | 7/2002 |
| JP | 2004-036461 A | 2/2004 |

* cited by examiner

*Primary Examiner*—John T. Kwon
(74) *Attorney, Agent, or Firm*—Foley & Lardner LLP

(57) ABSTRACT

In control method and apparatus for a direct injection spark ignited internal combustion engine, the internal combustion engine comprising a fuel injection valve configured to perform an injection of fuel through an engine cylinder and a spark plug, a super retard combustion comprising: an ignition through the spark plug at a timing after a compression top dead center; and at least once fuel injection in which the injection of fuel is started at a timing after the compression top dead center and before the ignition, during a cold start of the engine, is executed, and an execution of the super retard combustion is inhibited for a predetermined interval of time immediately after the cold start of the engine.

16 Claims, 13 Drawing Sheets

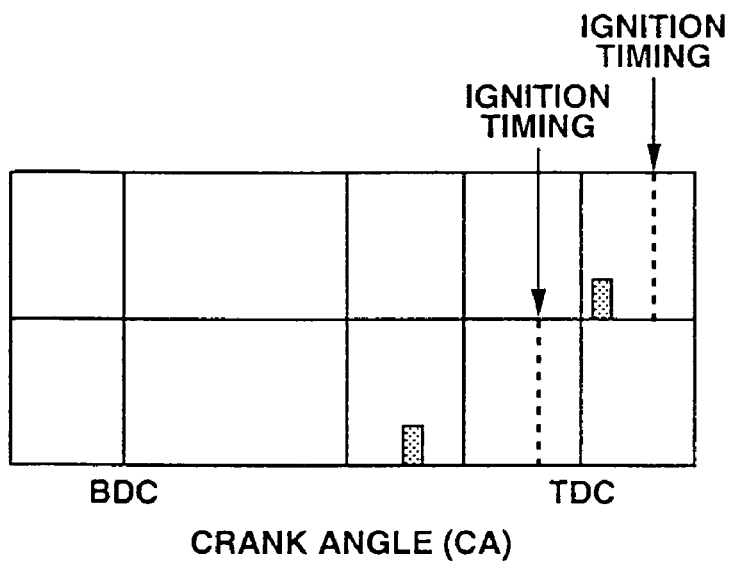
FIG.4A
FIG.4B
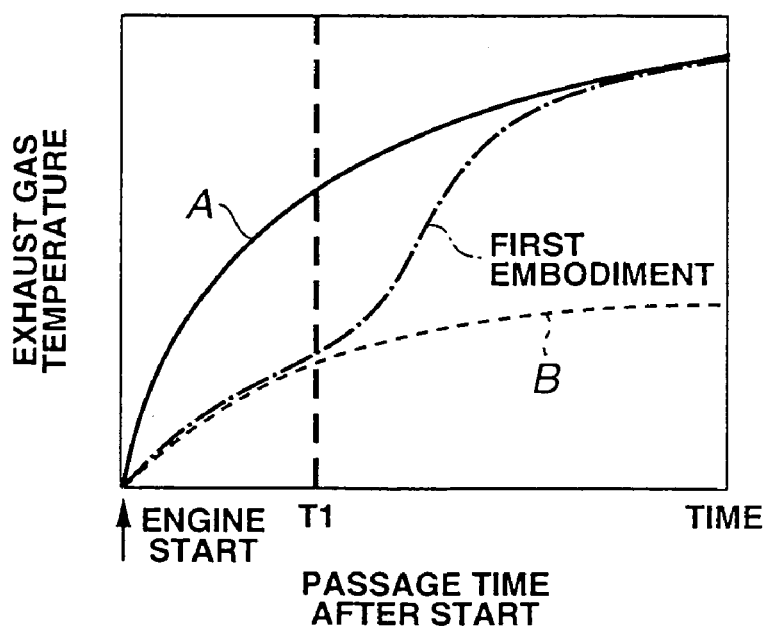
FIG.5

CONTROL METHOD AND APPARATUS FOR DIRECT INJECTION SPARK IGNITED INTERNAL COMBUSTION ENGINE

BACKGROUND OF THE INVENTION

The present invention relates generally to an inner cylinder direct injection spark ignited internal combustion engine (hereinafter, also referred to as a direct injection spark ignited internal combustion engine or also simply referred to as an engine) in which fuel is directly injected into an inner part of en engine cylinder and relates particularly to a control technique for the direct injection spark ignited internal combustion engine in which appropriate controls of a fuel injection timing and an ignition timing are carried out during a cold engine start demanding an earlier temperature rise (earlier activation) of a catalytic converter (or called a catalyst) in an exhaust system of the engine.

A Japanese Patent No. 3325230 issued on Jul. 5, 2002 (which corresponds to a U.S. Pat. No. 6,345,499 issued on Feb. 12, 2002) describes a previously proposed technique in which, as a catalyst warming up method of the direct injection spark ignited internal combustion engine, at least twice (two times) split injections are carried out which include: a later period injection to form an air mixture fuel having a partial rich and lean air-fuel ratio within a combustion chamber within an interval of time from a suction stroke to an ignition timing; and an earlier period injection in which fuel is injected at a timing before the later period injection to enable a spreading of fire with a fuel at the later period injection and with a combustion at the later period injection to generate the air mixture fuel of a leaner air-fuel ratio than a stoichiometric air-fuel ratio, when an exhaust gas purification purpose catalytic converter is in an un-warmed up state in which a catalytic converter temperature is lower than an activation temperature of the catalytic converter, the ignition timing is retarded by a predetermined quantity toward a more retard angle side than an MBT (Minimum angle for Best Torque) point, an ignition timing is set before a compression (stroke) top dead center in a no-load region of the engine, and the ignition timing is retarded after the compression top dead center in a low-speed-and-low-load region except the no-load region. The above-described later period injection is carried out after a middle period of the compression stroke, for example, 120° BTDC (Before Top Dead Center) through 45° BTDC.

SUMMARY OF THE INVENTION

It is effective to retard the ignition timing in order to reduce HC (Hydrocarbon) through an earlier activation of the catalytic converter and through an after burning of HC, during a cold start of the engine. It is desirable to perform an ignition at a timing after the compression (stroke) top dead center (an, so-called, ATDC ignition) in order to obtain a larger effect of reducing HC. It is necessary to shorten a combustion interval of time in order to have the engine perform a stable combustion by means of the ATDC ignition. In order to achieve this, it is necessary to strengthen a turbulence developed within an engine cylinder and raise a combustion speed (a flame propagation speed). In order to strengthen such a turbulence as described above, it may be considered that this turbulence is developed due to an energy of a fuel spray injected into an engine cylinder under a high pressure. However, in the technique disclosed in the above-described Japanese Patent, the first time injection (the earlier period injection) is carried out during a suction stroke and the second time injection (the later period injection) is carried out during 120° BTDC (Before Top Dead Center) through 45° BTDC in a compression stroke. In this way, since the later period fuel injection is carried out before the compression top dead center, the turbulence is attenuated at a time after the compression top dead center and does not contribute to a rise in the flame propagation speed by means of the ATDC ignition even if the fuel spray caused by the later period injection develops the turbulence within the engine cylinder.

For example, suppose that magnitudes of the turbulences within the engine cylinder in a case where a gas flow control valve (for example, a tumble control valve) installed within an intake port of the engine is operated and in a case where such a gas flow control valve as described above is not installed in the engine are observed. An operation of the gas flow control valve causes the turbulence developed during the suction stroke to be attenuated along with an advance of the compression stroke. Along with a collapse of a tumble flow at a later period of the compression stroke, the turbulence becomes temporarily large. However, the turbulence is rapidly attenuated after the compression top dead center. An improvement in the combustion (an improvement in the flame propagation) using this turbulence cannot be expected. The same thing is applied to the turbulence caused by the fuel spray. Even if the turbulence through the fuel injection before the compression top dead center is developed, the turbulence does not contribute to an ignition combustion after the compression top dead center.

Therefore, the ATDC ignition is advantageous in the rise in the exhaust gas temperature and in the reduction of HC. However, a combustion stability is not established. In the previously proposed technique described in the above-described Japanese Patent, the ignition timing is set before the compression top dead center (a, so-called, BTDC ignition) in a no-load region.

It is, therefore, an object of the present invention to provide control method and apparatus for the direct injection spark ignited internal combustion engine which can improve the combustion stability at the ATDC ignition which makes the catalyst (catalytic converter) activate at an earlier stage of an engine start and reduces HC (Hydrocarbon).

According to one aspect of the present invention, there is provided with a control method for a direct injection spark ignited internal combustion engine, the direct injection spark ignited internal combustion engine comprising: a fuel injection valve configured to perform a direct injection of fuel into an engine cylinder and a spark plug and the control method comprising: executing a super retard combustion comprising an ignition through the spark plug at a timing after a compression top dead center and at least once fuel injection in which the injection of fuel is started at a timing after the compression top dead center and before the ignition, during a cold start of the engine; and inhibiting an execution of the super retard combustion for a predetermined interval of time immediately after the cold start of the engine.

According to another aspect of the present invention, there is provided with a control apparatus for a direct injection spark ignited internal combustion engine, the direct injection spark ignited internal combustion engine comprising: a fuel injection valve configured to perform a direct injection of fuel into an engine cylinder; and a spark plug and the control apparatus comprising: a super retard combustion executing section configured to execute a super retard combustion comprising an ignition through the spark plug at a timing after a compression top dead center and at least once fuel injection in which an injection of fuel through each fuel injection valve is started at a timing after the compression top dead center and before the ignition, during a cold start of the engine; and an inhibiting section configured to inhibit an execution of the super retard combustion for a predetermined interval of time immediately after the cold start of the engine.

This summary of the invention does not necessarily describe all necessary features so that the present invention may also be a sub-combination of these described features.

BRIEF DESCRIPTION OF THE DRAWINGS

FIGS. 4A and 4B are characteristic graphs representing examples of the super retard combustion (FIG. 4A) and a compression stroke injection and of a BTDC (Before Top Dead Center) ignition (FIG. 4B).

FIG. 5 is a characteristic graph representing characteristic lines of an exhaust gas temperature immediately after the cold start of the engine shown in FIG. 1 including a case of the first embodiment of the control method.

DETAILED DESCRIPTION OF THE INVENTION

Reference will hereinafter be made to the drawings in order to facilitate a better understanding of the present invention.

(First Embodiment)

Figure 1:
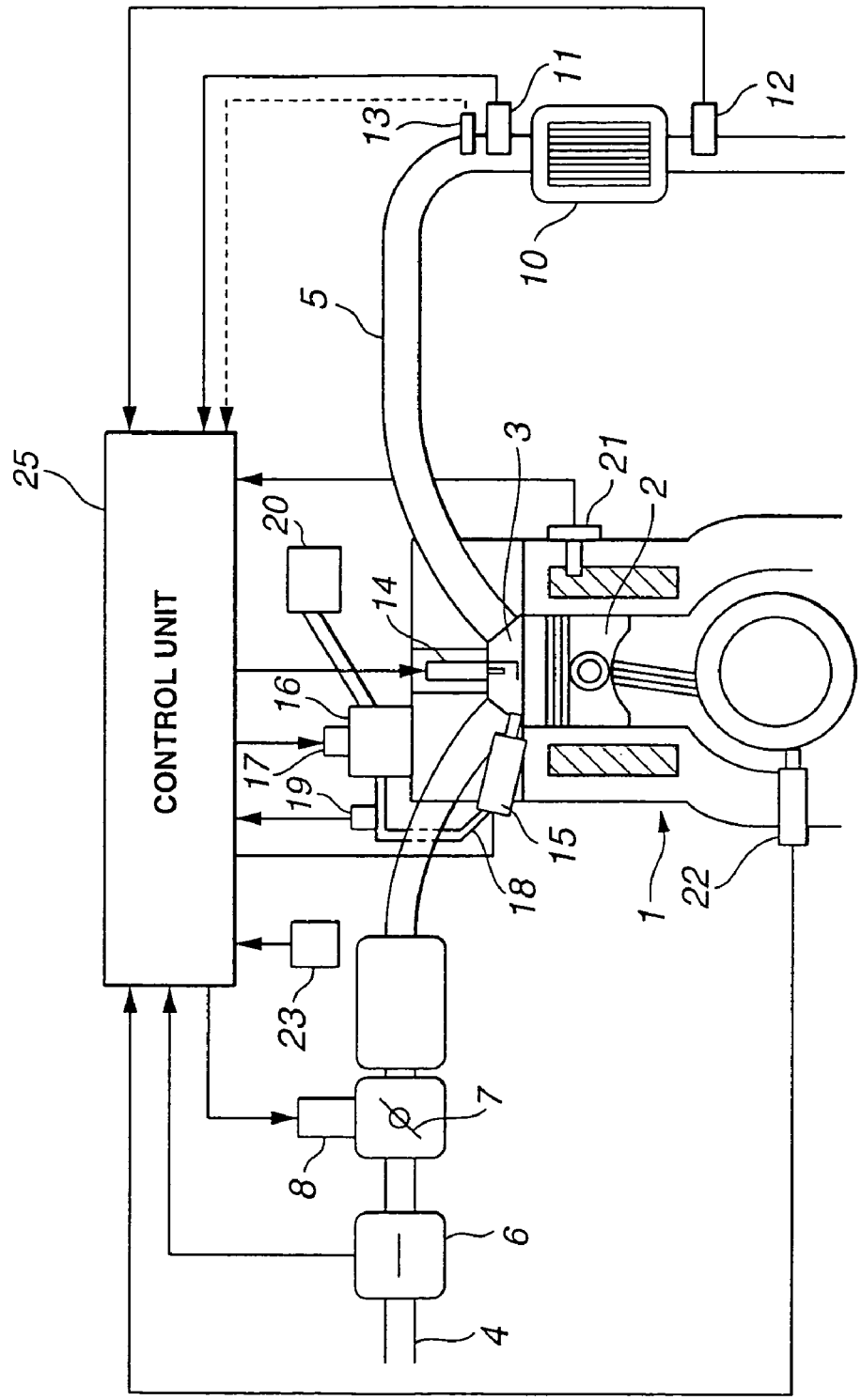
FIG. 1 is a system configuration view representing a whole direct injection spark ignited internal combustion engine to which a control method according to the present invention is applicable.

FIG. 1 shows a system configuration of a direct injection spark ignited internal combustion engine to which a control method according to the present invention is applicable. In a first preferred embodiment according to the present invention, during a cold start of the engine requiring an earlier rise in temperature of a catalytic converter disposed in an exhaust system of the engine, such a super retard combustion that an ignition timing is set after a compression (stroke) top dead center and fuel is injected before this ignition timing and after the compression top dead center is carried out. Furthermore, the super retard combustion is inhibited within a predetermined interval of time immediately after the engine start. It is noted that the term of immediately after is used to have the same meaning as upon a completion of.

An intake (air) passage 4 is connected via an intake valve with a combustion chamber 3 formed by a piston 2 of engine 1. An exhaust (gas) passage 5 is connected via an exhaust valve with combustion chamber 3. An airflow meter 6 is disposed within intake passage 4 to detect an intake air quantity. An electronically controlled throttle valve 7 is disposed whose opening angle is controlled by means of an actuator 8 in response to a control signal. An exhaust gas purification purpose catalytic converter 10 is disposed within exhaust (gas) passage 5. Air-fuel ratio sensors 11 and 12 are installed at upstream side and downstream sides of a catalytic converter 10, respectively. An exhaust gas temperature sensor 13 is disposed at an adjacent portion of upstream side air-fuel ratio sensor 11 to detect an exhaust gas temperature at an inlet side of catalytic converter 10. A spark plug 14 is disposed on a center top portion of combustion chamber 3. A fuel injection valve (or fuel injector) 15 is disposed at a side of intake passage 4 of combustion chamber 3 to directly inject fuel into combustion chamber 3. A given quantity of fuel whose pressure is regulated under a predetermined pressure by means of a high pressure fuel pump 16 and a pressure regulator 17 is supplied to fuel injection valve 15 via a high pressure fuel passage 18. Hence, when fuel injection valve 15 for each cylinder is open in response to a control pulse, fuel whose quantity is varied in accordance with a valve open interval is injected into corresponding combustion chamber 3. It is noted that a reference numeral 19 denotes a fuel pressure sensor to detect a fuel pressure and a reference numeral 20 denotes a low pressure fuel pump by which fuel is supplied to high pressure fuel pump 16.

In addition, a coolant temperature sensor 21 to detect an engine coolant temperature and a crank angle sensor 22 to detect a crank angle (CA) of engine 1 are disposed within engine 1. Furthermore, an accelerator opening angle sensor 23 to detect a depression quantity (a manipulated variable of an accelerator) of an accelerator pedal by a vehicle driver is disposed.

A fuel injection quantity, a fuel injection timing, and an ignition timing of engine 1 are controlled by means of a control unit 25. This control unit 25 inputs detection signals from various kinds of the sensors described above. Control unit 25 determines a combustion method, viz., whether the combustion is a homogeneous combustion or a stratified combustion and, at the same time, controls the fuel injection timing and the fuel injection quantity through fuel injection valve 15, the ignition timing of spark plug 14, and so forth. It is noted that, after the engine warm up is finished, in a predetermined low-speed-and-low-load region, the fuel injection is carried out at an appropriate timing during a compression stroke and an ignition of fuel is carried out at a timing before a compression stroke top dead center, as an ordinary stratified combustion driving. A fuel spray is collected in a proximity of spark plug 14 in a stratification form. Thus, an extremely lean stratified combustion in which an air-fuel ratio is approximately from 30 to 40 can be achieved. In addition, in a predetermined high-speed-and-high-load region, the fuel injection is carried out at a timing during a suction stroke and the ignition is carried out at a timing in a proximity to an MBT (Minimum angle for Best Torque) point before the compression top dead center, as an ordinary homogenous combustion driving. In this case, fuel becomes a homogenous air mixture fuel within the corresponding cylinder. This homogenous combustion driving includes a homogenous stoichiometric combustion with the air-fuel ratio set to the stoichiometric air-fuel ratio and a homogenous lean combustion with the air-fuel ratio set to a lean state of approximately from 20 to 30 according to an engine driving condition.

In the first embodiment, the super retard combustion is carried out in such a way that an exhaust gas temperature becomes high, during a clod start of engine 1 in which an earlier temperature rise in catalytic converter 10 is required (demanded). Hereinafter, the fuel injection timing and the ignition timing in the super retard combustion will be described below with reference to FIG. 2.

Figure 2:
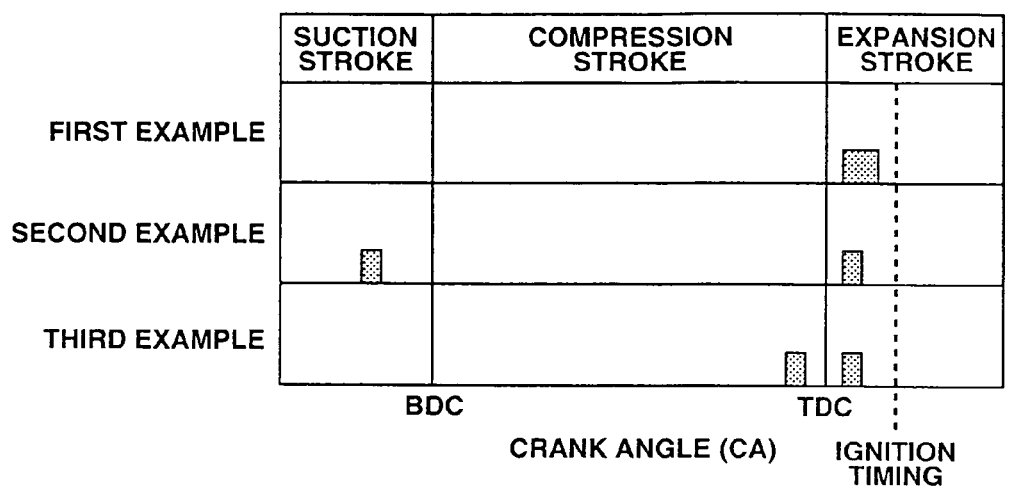
FIG. 2 is a characteristic graph representing first, second, and third examples of a super retard combustion to be executed in each of first, second, and third preferred embodiments of the control method according to the present invention.

FIG. 2 shows three examples of the super retard combustion. In a first example, the ignition timing is set to 15° through 30° ATDC (After Top Dead Center) (for example, 20° ATDC) and the fuel injection timing (in details, a fuel injection start timing) is set after the compression top dead center and before the ignition timing. It is noted that, at this time, the air-fuel ratio is set to the stoichiometric air-fuel ratio or to a slightly leaner (approximately from 16 to 17) than the stoichiometric air-fuel ratio.

That is to say, in order to promote a warming up of the catalyst (catalytic converter 10) and to reduce HC (Hydrocarbon), it is effective to retard the ignition timing. Then, the ignition after the compression top dead center (an, so-called, ATDC ignition) is desirable. However, in order to have engine 1 perform a stable combustion by means of the ATDC ignition, it is necessary to shorten the combustion interval of time. To shorten the combustion interval of time, it is necessary to promote a flame propagation caused by a turbulence. As described above, the turbulence developed at the suction stroke and the compression stroke is attenuated. However, in this embodiment according to the present invention, a high pressure fuel injection carried out during an expansion stroke after the compression top dead center causes a gas flow to be developed. This gas flow can develop and strengthen the disturbance within the cylinder. Hence, the flame propagation at the ATDC ignition is promoted so that it becomes possible for the stable combustion to be established.

A second example in FIG. 2 is an example in which the fuel injection is split into two times fuel injections. A first time fuel injection is carried out at a time during the suction stroke and a second time fuel injection is carried out at a time after the compression top dead center. It is noted that the ignition timing and the air-fuel ratio (a total air-fuel ratio of the two times injections) are the same as the first example.

In the way as in the second example, when the fuel injection (suction stroke injection) during the suction stroke is carried out prior to the fuel injection (expansion stroke injection) after the compression top dead center, the turbulence caused by the fuel spray of the suction stroke injection is attenuated at a later half of the compression stroke and hardly gives an influence on a gas flow strengthening after the compression stroke top dead center. However, since the fuel combustion is diffused over the whole combustion chamber, the fuel combustion contributes to the promotion of the after burning of HC through the ATDC ignition. Hence, this second example is effective for the HC reduction and the exhaust gas temperature rise.

In addition, in a third example in FIG. 2, the fuel injection is split into two times, the first time fuel injection being carried out at the compression stroke and the second time fuel injection being carried out after the compression top dead center. In the third example, prior to the fuel injection (expansion stroke injection) after the compression top dead center, the fuel injection during the compression stroke (compression stroke injection) is carried out. In this case, as compared with the suction stroke fuel injection in the second example, the compression stroke fuel injection provides a delay in the attenuation of the turbulence caused by the fuel spray of the compression stroke injection. Hence, the turbulence caused by the first time fuel injection is left. The second time fuel injection is carried out after the compression top dead center so that the turbulence can be strengthened so as to promote the turbulence developed at the first time fuel injection and a further gas flow strengthening in the proximity to the compression top dead center can be achieved.

In the case of the third example, the first time compression stroke injection may be carried out at a first half of the compression stroke. However, if the first time injection is set to a later half of the compression stroke (after 90° BTDC), the turbulence in the proximity to the top dead center can furthermore be raised. Especially, if this first time compression stroke fuel injection is carried out after 45° BTDC, desirably, after 20° BTDC, the gas flow after the compression top dead center can furthermore be strengthened.

As described above, according to the super retard combustion of the first, second, and third examples described with reference to FIG. 2, the turbulence within the cylinder can be developed and strengthened by means of the fuel spray immediately before the ignition, the flame propagation can be promoted. In addition, the stable combustion can be achieved. Especially, since the ignition timing is retarded up to 15° through 30° ATDC, an earlier activation of catalytic converter 10 and a sufficient after burning effect to reduce HC can be achieved. In other words, even if the ignition timing is retarded, the fuel injection is retarded immediately before the ignition timing to retard (delay) a development timing of the turbulence. Thus, a combustion improvement due to the flame propagation improvement can be achieved.

On the other hand, since, in the above-described super retard combustion, the fuel injection is carried out after the compression top dead center, an interval of time from the fuel injection to the ignition, viz., a fuel vaporization time becomes short. Hence, during an interval of time (for example, during the interval of time from several seconds to several ten seconds) immediately after a cold start of engine 1 in which an inner cylinder temperature (in other words, a combustion chamber wall temperature) is very low, there is an tendency that a development quantity of unburned HC is increased along with an insufficient vaporization of fuel. In addition, immediately after such a cold start as described above, an exhaust system temperature is also low. An oxidization (or oxidation) of HC within exhaust gas passage 5 is not sufficiently promoted. The unburned HC developed within the cylinder becomes easily and directly exhausted without oxidization (oxidation) to an external of engine 1.

Figure 3:
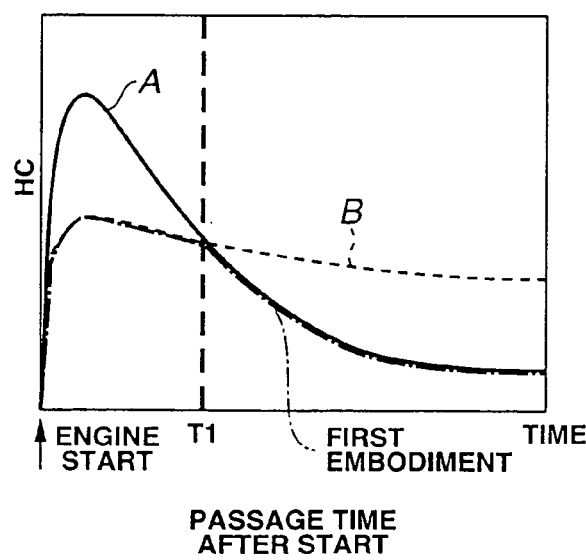
FIG. 3 is a characteristic graph representing characteristic lines of a development quantity of HC (Hydrocarbon) immediately after a cold start of the engine shown in FIG. 1.

FIG. 3 shows a characteristic graph of HC development quantity immediately after such a cold start as described above. In FIG. 3, a characteristic line A denotes the development quantity of HC in the case of the super retard combustion shown in FIG. 4A (this is the same as the first example in FIG. 2) and a characteristic line B denotes the development quantity of HC in the case of the combustion (the compression stroke fuel injection and the ignition before compression top dead center are carried out) shown in FIG. 4B. As shown in FIG. 3, in the case of the super retard combustion characteristic line A, HC development quantity becomes larger than the case of the characteristic line B during the predetermined interval of time immediately after the cold start in which the inner cylinder temperature is very low. Thereafter, when the inner cylinder temperature becomes warm to some degree, HC development quantity becomes very small.

Therefore, according to the first embodiment, the super retard combustion is inhibited within the predetermined interval of time (for example, the interval of time during which the HC development quantity in characteristic line A is larger than characteristic line B) immediately after the cold start and the combustion mode is, for example, the compression stroke fuel injection and BTDC ignition is carried out as shown in FIG. 4B. Consequently, the HC development quantity is obtained as denoted by a characteristic line of a dot-and-dash line in FIG. 3.

On the other hand, an attention is paid to a characteristic of the exhaust gas temperature. As shown in FIG. 5, as compared with the super retard combustion of characteristic line A, characteristic line B provides a slow rise in the exhaust gas temperature. However, even if, during the interval of time from the engine start to a time point T1, the super retard combustion is inhibited and the compression stroke fuel injection and the BTDC ignition (refer to FIG. 4B) are carried out, after the switch of the combustion mode to the super retard combustion, the exhaust gas temperature rise becomes speedy as denoted by the dot-and-dash line in FIG. 5. Hence, a required time for the catalytic converter to be activated which is a final target is almost the same as a case where the combustion mode is, from the first (namely, from a time at which engine 1 is cold started), the super retard combustion mode as denoted by characteristic line A.

Figure 6:
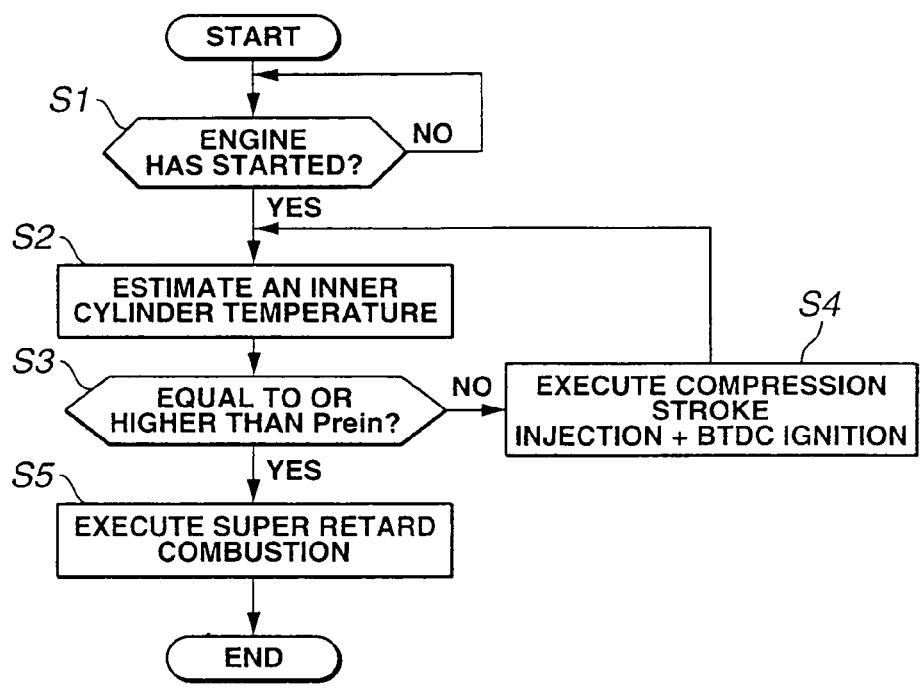
FIG. 6 is a flowchart representing an example of a combustion control executed in the case of the first embodiment of the control method according to the present invention.
Figure 7:
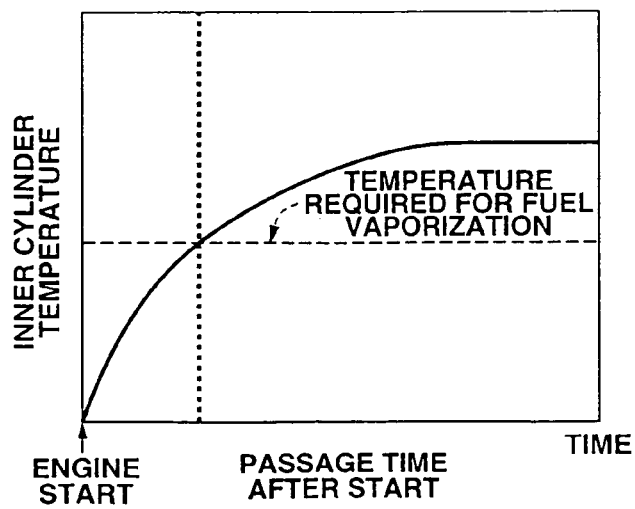
FIG. 7 is an explanatory view for estimating an inner cylinder temperature after the cold start of the engine shown in FIG. 1.

FIG. 6 shows a flowchart representing an example of the combustion control process executed at a time of the cold start of engine by control unit 25. If, at a step S1, control unit 25 detects that engine 1 has started, the routine goes to a step S2, At step S2, control unit 25 estimates the (present) inner cylinder temperature. At a step S3, control unit 25 determines whether the estimated inner cylinder temperature has reached to a predetermined temperature Prein (the predetermined temperature is a minimum temperature of the inner cylinder required for the fuel vaporization). The inner cylinder temperature is gradually raised with a certain time constant after the start of engine 1, as shown in FIG. 7, and can be estimated using parameters such as the coolant temperature during the start of engine 1, an accumulated intake air quantity, an engine speed, and a load. Furthermore, in order to simplify the control process shown in FIG. 6, control unit 25 may determine whether the inner cylinder temperature has reached to predetermined temperature Prein simply according to a passage time from the time at which engine 1 has started.

If control unit 25 determines that the inner cylinder temperature does not reach to predetermined temperature Prein, during the time at which the inner cylinder temperature reaches to predetermined temperature, the super retard combustion is inhibited and the routine goes to a step S4. At step S4, control unit 4 executes the combustion mode in which the compression stroke fuel injection and the BTDC ignition are carried out as shown in FIG. 4B. If the inner cylinder temperature has reached to predetermined temperature Prein (Yes at step S3), the routine goes to a step S5 at which control unit 25 executes the super retard combustion as shown in FIG. 2. It is noted that, although the super retard combustion is carried out as in the first example shown in FIG. 2, the split injections such as the second or third examples shown in FIG. 2 may be carried out. It is also noted that the combustion mode executed at step S4 may be a generally known homogenous combustion, a generally known stratified combustion, or the BTDC ignition in which the suction stroke fuel injection (the fuel injection during the suction stroke) and the compression stoke fuel injection (the fuel injection during the compression stroke) are carried out.

Figure 8:
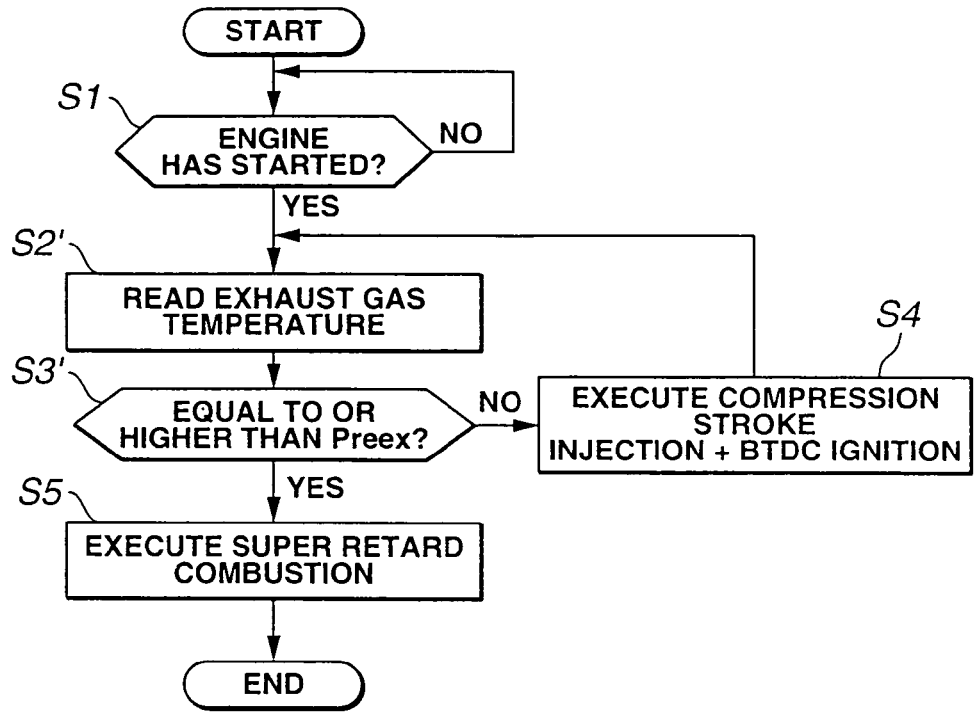
FIG. 8 is a flowchart representing another example of the combustion control executed in the case of the first embodiment.
Figure 9:
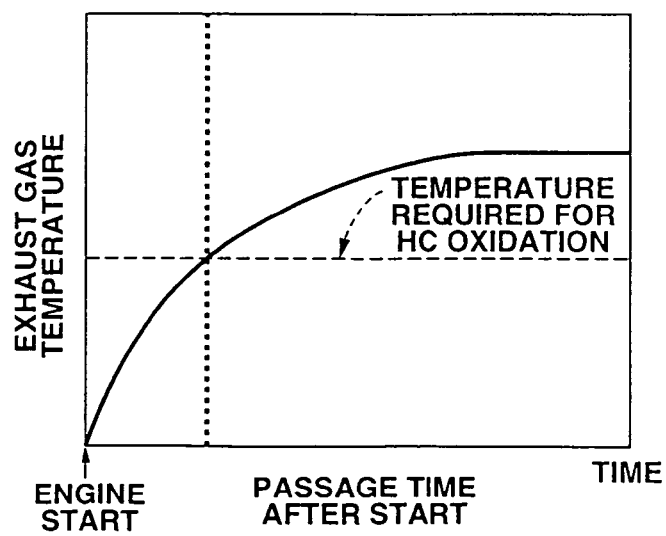
FIG. 9 is an explanatory view for estimating an exhaust gas temperature after the cold start of the engine shown in FIG. 1.

Next, FIG. 8 shows a flowchart representing another example of the definition of the interval of time during which the super retard combustion is inhibited on the basis of the exhaust gas temperature. In details, immediately after the engine cold start in which the exhaust system temperature is low, the oxidization of HC within exhaust passage 5 is not sufficiently promoted and the unburned HC developed within the engine cylinder becomes directly and easily exhausted externally. However, if the exhaust gas temperature becomes high to some degree, the unburned HC is oxidized within exhaust passage 5. This flowchart shown in FIG. 8 is similar to FIG. 6. If engine 1 is started, the routine goes from step S1 to a step S2'. At step S2', control unit 25 reads the detected exhaust gas temperature from exhaust gas temperature sensor 13. At a step S3', control unit 25 determines whether the read exhaust gas temperature has reached to a predetermined temperature Preex (a minimum temperature required for the fuel vaporization). The exhaust gas temperature is, as shown in FIG. 9, gradually raised with the certain time constant after the start of engine 1. Hence, in place of the direct detection by means of exhaust gas temperature sensor 13, the exhaust gas temperature may be estimated using the parameters such as the coolant temperature after the start, the accumulated intake air quantity, the engine speed, and the load. In order to further simplify the control, the determination of whether the exhaust gas temperature has reached to predetermined temperature Preex may be based on the passage time from the time of the start of engine 1.

If, at step S3', control unit 25 determines that the exhaust gas temperature has not yet reached to predetermined temperature Preex (No at step S3'), the super retard combustion is inhibited during the interval of time the exhaust gas temperature has reached to predetermined temperature Preex and the routine goes to step S4. At step S4, control unit 25 executes the BTDC ignition in which the compression stroke fuel injection is carried out as shown in FIG. 4B. If the exhaust gas temperature is not reached to predetermined temperature Preex (Yes at step S3'), control unit 25 executes the super retard combustion at step S5. This super retard combustion to be executed includes the first example shown in FIG. 2. However, either the second example shown in FIG. 2 or third example shown in FIG. 2 may be carried out. The combustion mode carried out at step S4 may include the generally known homogenous combustion, the generally known stratified combustion, or the BTDC ignition in which the suction stroke fuel injection and the compression stroke fuel injection are carried out.

Figure 10:
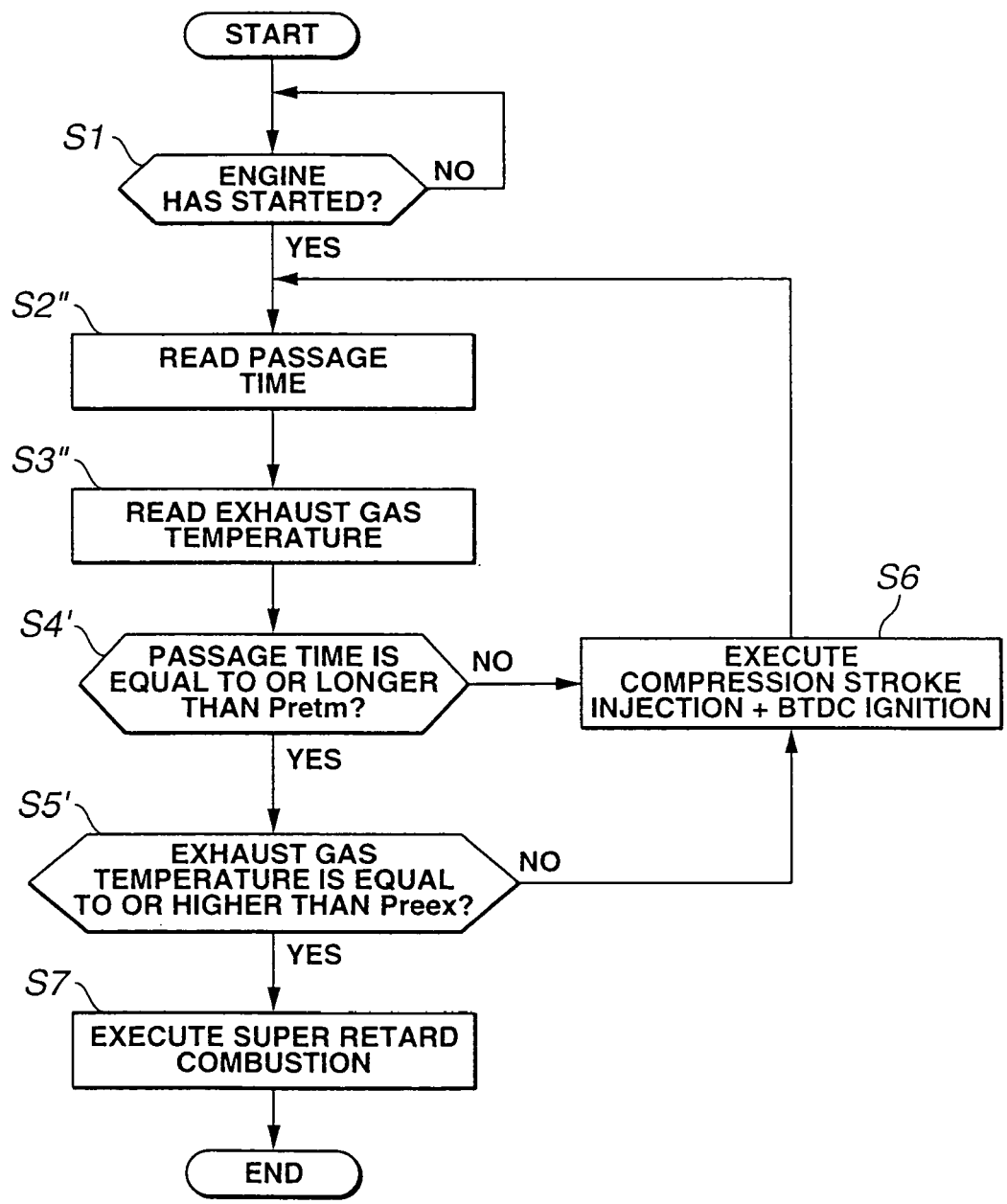
FIG. 10 is a flowchart representing a still another example of the combustion control executed in a case of the first embodiment.

FIG. 10 shows a flowchart of a still another example of the combustion control executed by control unit 25 representing the definition of the interval of time during which the super retard combustion is inhibited on the basis of both of the inner cylinder temperature and the exhaust gas temperature. It is noted that the inner cylinder temperature is estimated simply from the passage time from the start of engine 1 and the exhaust gas temperature is directly detected by means of exhaust gas temperature sensor 13. However, these temperatures may be estimated from the other parameters described above. If, at step S1, control unit 25 determines that engine 1 has started, the routine goes to a step S2". At step S2", control unit 25 reads the passage time from the time at which engine 1 has started from a timer installed within control unit 25 and, at a step S3", control unit 25 reads the detected exhaust gas temperature from exhaust gas temperature sensor 13. Next, at a step S4', control unit 25 determines whether the passage time from the start of engine 1 has reached to a predetermined time Pretm (a time duration for which the inner cylinder temperature has reached to the temperature required for the fuel vaporization) and, at a step S5', control unit 25 determines whether the exhaust gas temperature has reached to predetermined temperature Preex (the minimum temperature required for the HC oxidation described above).

If, at either or both of step S4' or step S5', the passage time from the start of engine 1 or exhaust gas temperature has not reached to predetermined time Pretm or to predetermined temperature Preex, the super retard combustion is inhibited and the routine goes to a step S6 at which the compression stroke fuel injection and BTDC ignition are carried out as shown in FIG. 4B. If the passage time after the start of engine 1 has reached to predetermined time Pretm and the exhaust gas temperature has reached to predetermined temperature Preex, the routine goes to step S7 at which control unit 25 executes the super retard combustion. It is noted that, as described above, the super retard combustion may include the split injections as described in each of the second and third examples shown in FIG. 2 in addition to the first example shown in FIG. 2. The combustion mode at step S6 may include the generally known homogenous combustion, the generally known stratified combustion, and the BTDC ignition in which both of the suction stroke fuel injection and compression stroke fuel injection are carried out.

(Second Embodiment)

In a second embodiment of the control method for the direct injection spark ignited internal combustion engine, during the clod start in which the earlier activation of catalytic converter 10 is demanded, the super retard ignition is carried out in which the ignition timing is set after the compression top dead center and fuel is injected before this ignition timing and after the compression top dead center. In addition, during the predetermined interval of time immediately after the engine cold start, the super retard combustion is inhibited and, during a transfer of the combustion mode from the predetermined interval of time during which the super retard ignition is inhibited to the super retard combustion, a temperature rise phase in which the ignition timing is set to a more advance angle side than the ignition timing in the case of the super retard combustion is executed.

That is to say, after the compression top dead center, the turbulence developed during the suction stroke and the compression stroke is attenuated. However, the turbulence within the cylinder can be developed and strengthened by means of the fuel injection carried out during the expansion stroke after the compression stroke top dead center and the flame propagation at the ATDC ignition can be promoted. Hence, the super retard combustion in which the ignition timing is set after the top dead center is stably established.

In the super retard combustion, there is a tendency that the development quantity of the unburned HC itself is increased due to an increase in a gas volume along with a reduction in a combustion efficiency (namely, an increase in the intake air quantity required to obtain the same torque). Then, since the exhaust system temperature is low immediately after the cold start of engine 1, the oxidation of HC is not sufficiently promoted. The unburned HC developed within the engine cylinder becomes easily and directly exhausted to the external of engine 1. In other words, if the super retard combustion is carried out immediately after the cold start of engine 1, HC exhausted from the exhaust system of engine 1 to the external is temporarily increased.

To solve the above-described problem, in the second embodiment of the control method according to the present invention, this super retard combustion is inhibited during the extremely short interval of time immediately after the cold start of engine 1. During the extremely short interval of time during which the super retard combustion is inhibited, for example, the fuel injection during the suction stroke or the compression stroke is carried out and the ignition timing is set before the compression top dead center. Then, while the combustion mode is transferred from the super retard combustion inhibiting interval of time to the super retard combustion, the temperature rise phase is executed in which the ignition timing is set at a more advance angle side than that of the super retard combustion. In the temperature rise phase, although the exhaust gas temperature is slightly lower than that in the super retard combustion, the development quantity of unburned HC becomes small so that, while a temporary increase in the HC exhaust quantity at a stage at which the exhaust system temperature is low can be suppressed, the exhaust system temperature can be raised.

The system configuration of the direct injection spark ignited internal combustion engine to which the control method in the second embodiment is applicable is already described in the first embodiment with reference to FIG. 1. In addition, the three examples of the super retard combustion (which are also applicable to the second embodiment) have already been described with reference to FIG. 2. Hence, the detailed descriptions thereof will herein be omitted.

In the super retard combustion described above, the fuel injection is carried out after the compression top dead center. Hence, the combustion efficiency is lowered. In addition, since the intake air quantity required to obtain the same torque is increased, there is an increasing tendency of the development quantity of the unburned HC itself due to the increase of its gas volume. Then, immediately after the cold start of engine 1, the exhaust system temperature is low. Hence, the oxidation of HC within exhaust passage 5 is not sufficiently promoted. The unburned HC developed within the cylinder becomes easily and directly exhausted to the external.

Figure 11A:
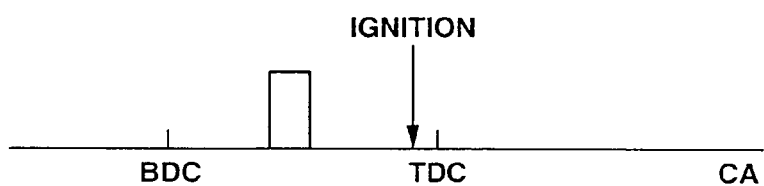
FIGS. 11A, 11B, and 11C are characteristic graphs integrally representing an example of a series of settings of fuel injection timings and ignition timings after the start of the engine shown in FIG. 1 in a case of the second preferred embodiment of the control method according to the present invention.
Figure 11B:
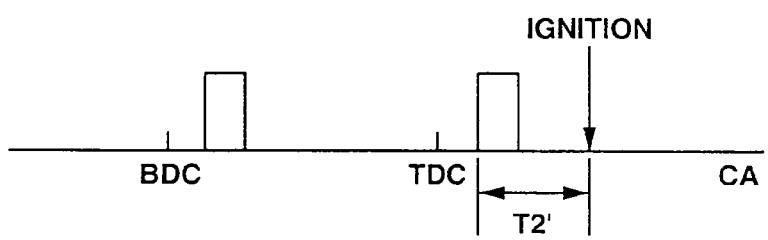
Figure 11C:
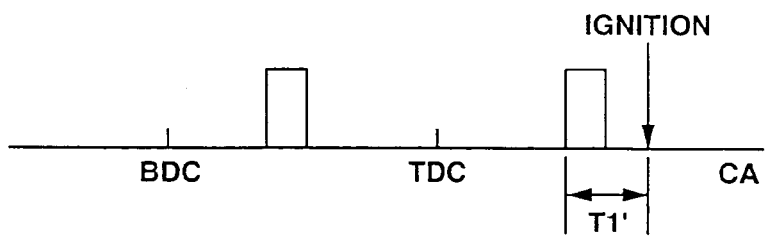

To solve the above-described problem, in the second embodiment, the settings of the injection timing and the ignition timing are switched into three stages immediately after the cold start of engine 1. FIGS. 11A, 11B, and 11C integrally show an example of the settings of the injection timing and the ignition timing changed at the three stages. Immediately after the cold start, a post-start phase shown in FIG. 11A is, at first, executed through control unit 25. In the post-start phase, the fuel injection is only once carried out during the compression stroke and the ignition is carried out at the timing before the compression top dead center. Next, the temperature rise phase shown in FIG. 11B is carried out. In this temperature rise phase, the fuel injection is split into two times injections. The first time injection is carried out during the compression stroke and the second time injection is carried out after the compression top dead center. Then, the ignition is carried out after the compression top dead center. It is noted that a retard angle quantity of the ignition timing from the compression top dead center is relatively small in the temperature rise phase shown in FIG. 11B. Next, the super retard combustion shown in FIG. 11C is executed through control unit 25. In this case, the third example shown in FIG. 2 is executed. That is to say, the fuel injection is split into the two times injections, the first time injection is carried out at the timing during the compression stroke and the second time injection is carried out at the timing after the compression top dead center. Then, the ignition is carried out at the timing after the compression top dead center. In this super retard combustion, the retard angle quantity of the ignition timing from the compression top dead center is large as compared with the ignition timing in the temperature rise phase. In addition, an interval T2' from the second time fuel injection start timing to the ignition timing in the temperature rise phase is relatively larger (wider) than an interval T1' in the case of the super retard combustion. Thus, the fuel vaporization time becomes long and the HC production (development) in the cold state is suppressed.

Figure 12:
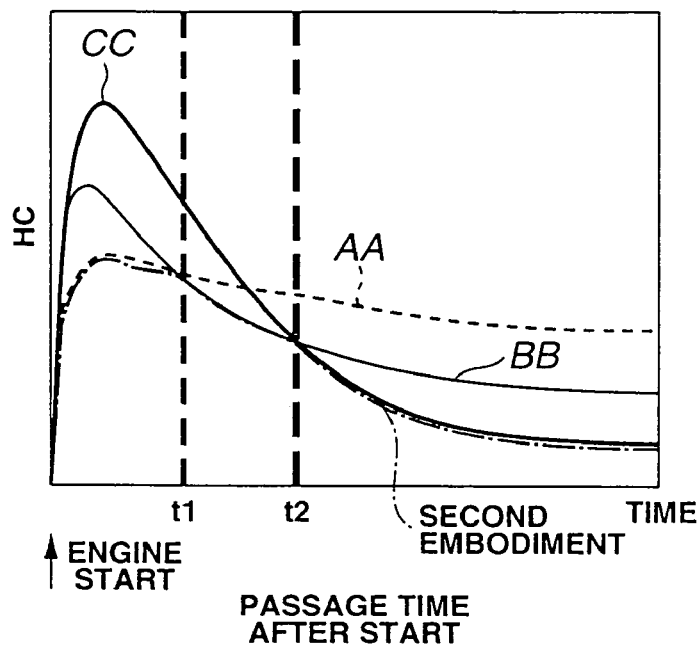
FIG. 12 is a characteristic graph representing an exhaust quantity of HC (Hydrocarbon) immediately after the cold start of the engine including a case of the second embodiment of the control method according to the present invention.

FIG. 12 shows the characteristics of HC exhaust quantity at a certain time duration immediate after the cold start of engine 1 according to the three kinds of settings as described above. As shown in FIG. 12, in a characteristic line CC of the super retard combustion, the exhaust quantity of HC is very high during the predetermined interval of time immediately after the cold start of engine 1 and, thereafter, is rapidly reduced. In the case of the post-start phase characteristic line AA, the exhaust quantity of HC at a time duration which is immediate after the cold start is small and, thereafter, a degree of decrease in the exhaust quantity of HC becomes small. After a certain time point, the exhaust quantity of HC becomes larger than the case of the super retard combustion (characteristic line CC). A characteristic line BB in the case of the temperature rise phase indicates an intermediate characteristic between both characteristic lines AA and CC. During the interval of time from a time point at which the cold start of engine 1 is carried out to a time point t1 shown in FIG. 12, the exhaust quantity of HC in the temperature rise phase (characteristic line BB) is larger than that in the case of the post-start phase (characteristic line AA). After a certain time point t2 shown in FIG. 12, the exhaust quantity of HC in the case of characteristic line BB is larger than that in characteristic line CC of the super retard combustion shown in FIG. 12. However, in characteristic line BB, during an interval of time from time point t1 to time point t2 shown in FIG. 12, the HC exhaust quantity in the case of the temperature rise phase characteristic line BB becomes smallest among three characteristic lines AA, BB, and CC.

In the second embodiment, the post-start phase shown in FIG. 11A is executed during the interval of time from the time point at which the start of engine 1 is carried out to time point t1 shown in FIG. 12, during the interval of time from time point t1 up to which the post-start phase is executed up to time point t2 shown in FIG. 12, the temperature rise phase shown in FIG. 11B is executed, and, after time point t2 shown in FIG. 12, the super retard combustion shown in FIG. 11C is executed. Thus, the exhaust quantity of HC provides a characteristic line denoted by the dot-and-dash line in FIG. 12. Consequently, the temporary increase in the quantity of HC at the interval of time immediately after the start of engine 1 can be avoided.

Figure 13:
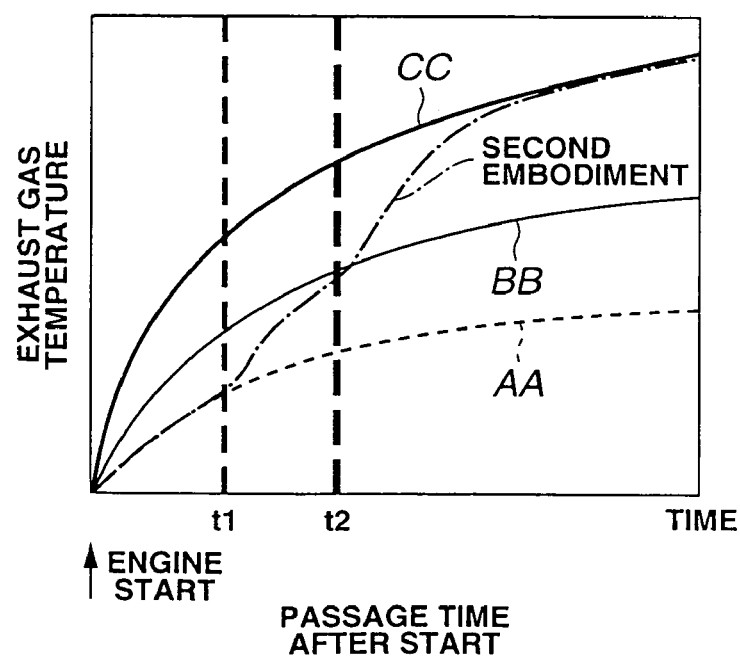
FIG. 13 is a characteristic graph representing an exhaust gas temperature immediately after the cold start of the engine including a case of the second embodiment of the control method according to the present invention.

In addition, the attention is paid to the characteristics of the exhaust gas temperature. As shown in FIG. 13, as compared with the super retard combustion in characteristic line CC, the temperature rise in the temperature rise phase of characteristic line BB is slow and the temperature rise in the post-start phase in characteristic line CC is furthermore slow. However, since the actual interval of time from time point t1 to time point t2 is very short, the combustion mode is switched from post-start phase shown in FIG. 11A to super retard combustion shown in FIG. 11C via the temperature rise phase shown in FIG. 11B, namely, sequentially switched from characteristic lines AA and BB to CC as shown in FIG. 13. Thus, the exhaust gas temperature is quickly raised as denoted by the dot-and-dash line of FIG. 13. The required time (duration) for the catalyst (catalytic converter 10) to be activated is almost the same as the case where the super retard combustion is from the first time continuously carried out (refer to characteristic lines of AA and second embodiment shown in FIG. 13).

Above-described time points t1 and t2 shown in FIGS. 12 and 13 are determined (defined) on the basis of the exhaust gas temperature at an inlet side of catalytic converter 10. In other words, according to whether the exhaust gas temperature detected by means of exhaust gas temperature sensor 13 has reached to a first set temperature and a second set temperature, the settings of the injection timing and the ignition timing are switched in the way described above. Since the exhaust gas temperature is gradually raised with the certain time constant after the engine start, in place of the direct detection of exhaust gas temperature sensor 13, such a parameter as the coolant temperature after the start of engine 1, the accumulated intake air quantity, the engine speed, and the load may be used to estimate the exhaust gas temperature. Furthermore, in order to further simplify the control, the mere passage time from the start of engine 1 may be used for switching the settings of the injection timing and the ignition timing in the way as described above. It is noted that, although the third example of the super retard combustion is used in the second embodiment, the super retard combustion in the first or second example may be applied to this embodiment.

Figure 14:
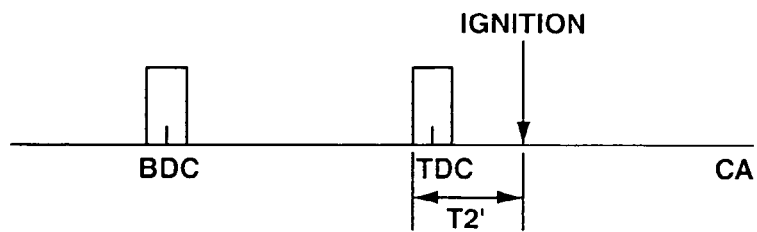
FIG. 14 is a characteristic graph representing another setting example of the fuel injection timing and the ignition timing in a temperature rise phase executed in the case of the second embodiment of the control method according to the present invention.
Figure 15:
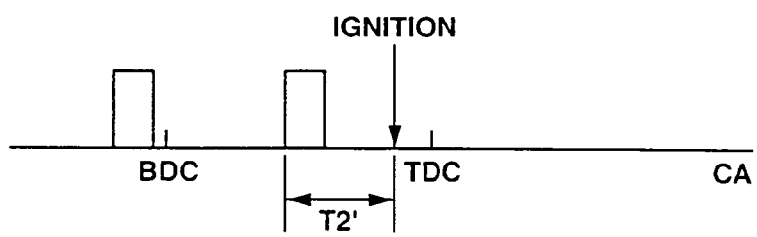
FIG. 15 is a characteristic graph representing a still another example of the fuel injection timing and the ignition timing in the temperature rise phase executed in the case of the second embodiment of the control method according to the present invention.

FIGS. 14 and 15 show examples of different settings of the injection timing and ignition timing in the case of the temperature rise phase described above in the second embodiment. In the example shown in FIG. 14, the fuel injections are carried out twice, the first time injection being carried out in a proximity to a suction bottom dead center (BDC) and the second time injection being carried out in a proximity to the compression top dead center (TDC). The ignition timing is set after the compression top dead center as shown in FIG. 14. In the other example in FIG. 15, the first time fuel injection is carried out at the time during the suction stroke and the second time fuel injection is carried out at the time during the compression stroke. The ignition timing is set before the compression top dead center as shown in FIG. 15.

(Third Embodiment)

In the third preferred embodiment of the control method according to the present invention, the super retard combustion in which the ignition timing is set after the compression (stroke) top dead center and fuel is injected at a timing before the ignition timing and after the compression top dead center is carried out at the time of the cold start of engine 1 in which the earlier temperature rise of catalytic converter 10 is demanded. In addition, prior to the execution of this super retard combustion, during a predetermined interval of time immediately after the cold start of engine 1, the temperature rise phase in which the ignition timing is set at a more advance angle side than that in the case of the super retard combustion and after the compression top dead center is executed.

That is to say, after the compression top dead center, the turbulence developed during the suction stroke and the compression stroke is attenuated. However, the turbulence within the cylinder can be developed and strengthened by means of the fuel injection carried out during the expansion stroke after the compression stroke top dead center and the flame propagation by means of the ATDC ignition can be promoted. Hence, the super retard combustion in which the ignition timing is set after the compression top dead center is stably established.

In the super retard combustion, there is a tendency that the development quantity of the unburned HC itself is increased due to the increase in the gas volume along with the reduction in the combustion efficiency (namely, the increase in the intake air quantity required to obtain the same torque). Then, since the exhaust system temperature is low immediately after the cold start, the oxidation of HC is not sufficiently promoted. The unburned HC developed within the cylinder becomes easily and directly exhausted to the external. In other words, if the super retard combustion is carried out immediately after the cold start of engine 1, the quantity of HC exhausted from the exhaust system to the external is temporarily increased.

To solve the above-described problem, in the third embodiment of the control method according to the present invention, within the extremely short interval of time immediately after the cold start of engine 1, as the temperature rise phase, the ignition timing is set to the slightly more advance angle side than the case of the super retard combustion although the ignition timing is the same as that after the compression top dead center. In other words, the combustion mode is transferred from the temperature rise phase to the super retard combustion. In the temperature rise phase, although the exhaust gas temperature is slightly lower than that in the super retard combustion, the combustion efficiency becomes higher than the super retard combustion due to the ignition timing being set at the more advance angle side. In addition, the gas volume becomes relatively reduced. Hence, the development quantity of unburned HC becomes small, as a total, so that, while a temporary increase in the HC exhaust quantity at a stage at which the exhaust system temperature is low can be suppressed, the exhaust system temperature can be raised.

The system configuration of the direct injection spark ignited internal combustion engine to which the control method in the third embodiment according to the present invention is applicable has already been described in the first embodiment with reference to FIG. 1. In addition, the three examples of the super retard combustion (which are also applicable to the third embodiment) have already been described with reference to FIG. 2. Hence, the detailed descriptions thereof will herein be omitted.

Figure 16A:
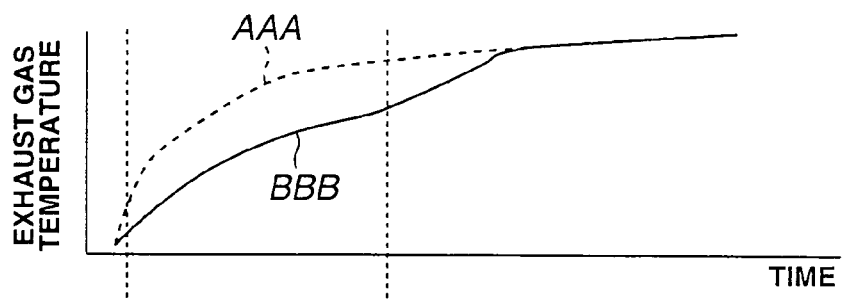
FIGS. 16A and 16B are characteristic graphs representing the exhaust gas temperature and the exhaust quantity of HC immediately after the cold start of the engine shown in FIG. 1 including a case of the third preferred embodiment of the control method according to the present invention.
Figure 16B:
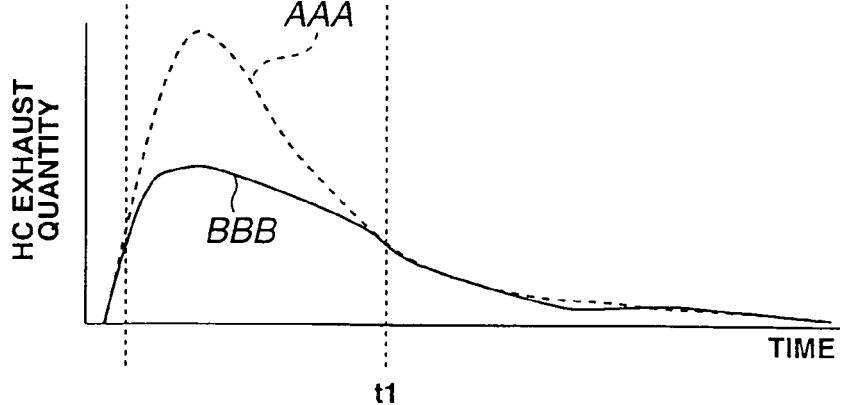

FIGS. 16A and 16B show characteristics of the development quantity of HC and exhaust gas temperature immediately after the cold start of engine 1. In FIGS. 16A and 16B, dot lines AAA denote characteristic lines of the development quantity of HC and exhaust gas temperature immediately after the cold start of engine 1 in the case where the super retard combustion shown in FIG. 17A (which is the same as the first example shown in FIG. 2) is started immediately after (upon) the cold start of engine 1. As appreciated from FIGS. 16A and 16B, in the case of the super retard combustion, during the interval of time immediately after (upon) the cold start of engine 1 in which the inner cylinder temperature is very low, the development quantity of HC due to the increase in the gas volume and the insufficient fuel vaporization becomes large. Thereafter, when the inner cylinder temperature becomes warm to some degree, the development quantity of HC is very low.

In the third embodiment, within the predetermined interval of time immediately after the start of engine 1 (for example, up to time point t1 shown in FIGS. 16A and 16B), the temperature rise phase in which the increase in the gas volume is suppressed is set. After the temperature rise phase is passed, the combustion mode is transferred to the super retard combustion.

Figure 17A:
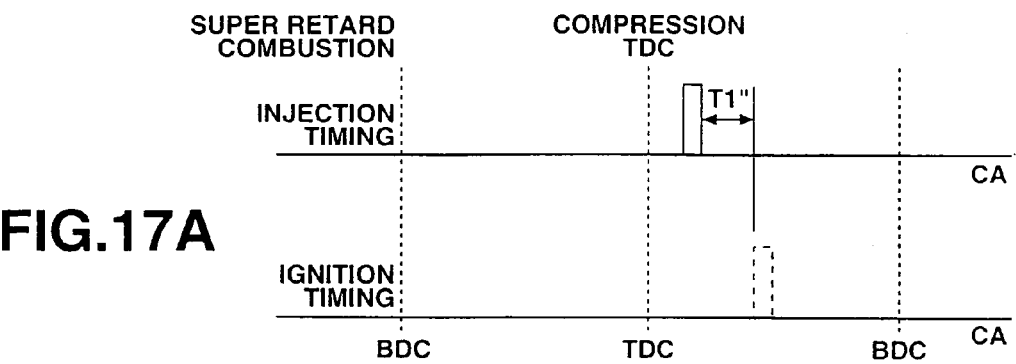
FIGS. 17A and 17B are characteristic graphs representing setting examples of the super retard injection and the temperature rise phase in a case of the third embodiment of the control method.
Figure 17B:
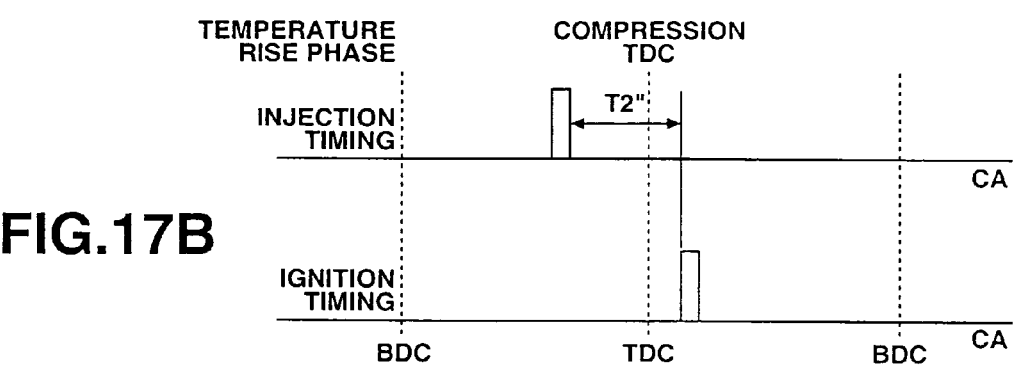

FIG. 17B shows an example of the setting of the temperature rise phase to be executed prior to the super retard combustion shown in FIG. 17A. In this example shown in FIG. 17B, the fuel injection is carried out before the compression top dead center and the ignition is carried out after the compression top dead center. It is noted that the ignition timing in the temperature rise phase shown in FIG. 17B is set at a more advance angle side than the ignition timing in the case of the super retard combustion. In other words, the ignition timing in the case of the super retard combustion is set toward a retard angle side up to a limit up to which the combustion can be established. Whereas, the ignition timing in the temperature rise phase is set after the compression top dead center but, in order to improve the combustion efficiency, is set at the more advance angle side than the ignition timing in the case of the super retard combustion (not set at the retard angle side up to the combustion limit). Thus, for example, the intake air quantity (in more strict sense of the word, the intake air quantity and the fuel quantity) required to maintain the same idling speed) becomes relatively small as the case of the super retard combustion and a total quantity of the development quantity of HC at an initial stage at which the exhaust gas temperature is low becomes small. In addition, interval T2" from the fuel injection start timing to the ignition timing is larger (wider) than interval T1" in the case of the super retard combustion. Thus, in the temperature rise phase, the vaporization time of fuel becomes long and the development of HC in the cold start state is suppressed.

Solid lines BBB shown in FIGS. 16A and 16B denote the development quantity and exhaust gas temperature in a case where the temperature rise phase is executed from time point at which the cold start of engine 1 is carried out to time point t1 shown in FIGS. 16A and 16B. As shown in FIGS. 16A and 16B, the temperature rise phase during which the gas volume is small is executed immediately after the cold start of engine 1 so that the temporary increase in the exhaust quantity of HC can be avoided. In addition, attention has been paid to the exhaust gas temperature. As shown in FIG. 16A, as compared with dot line AAA denoted in the case of the super retard combustion which is carried out from the first time upon the cold start of engine 1, solid line BBB indicates that the temperature rise at the initial stage of engine start 1 is slow. However, the exhaust gas temperature rise is relatively high by means of the ATDC ignition even in the temperature rise phase. In addition, after the combustion mode is switched from the temperature rise phase to the super retard combustion at time point t1 shown in FIGS. 16A and 16B, the super retard combustion causes a quick rise in the exhaust gas temperature. Hence, the required time for catalytic converter (catalyst) 10 to be activated which is the final target is almost the same as the case where the super retard combustion is, from the first time of the cold start of engine 1, carried out. It is noted that the predetermined interval of time from the time point at which the cold start of engine 1 is carried out to time point t1 shown in FIGS. 16A and 16B is, for example, several seconds through several ten seconds in the same way as described in the case of the first embodiment. It is also noted that, as appreciated from FIGS. 16A and 16B, it is desirable that the interval of time from the time point at which the cold start of engine 1 is carried out to time point t1 shown in FIGS. 16A and 16B at which the temperature rise phase is switched to the super retard combustion is basically made coincident with the interval of time during which the exhaust quantity of HC in the case of characteristic line BBB which denotes the temperature rise phase during the interval of time described above is smaller than that in the case of characteristic line AAA which denotes the super retard combustion which is, from the first time of engine start 1, carried out immediately after the cold start of engine 1.

Figure 18:
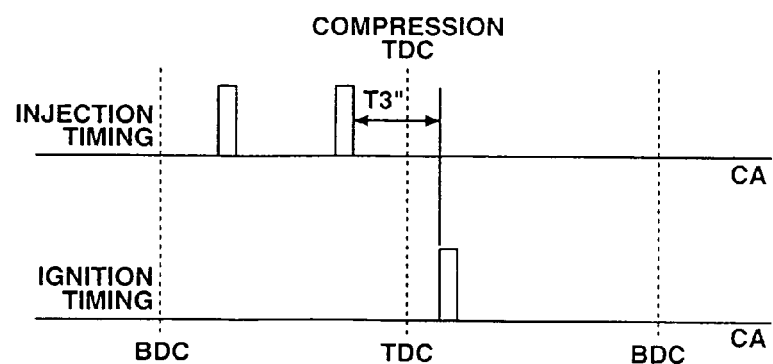
FIG. 18 is a characteristic graph of another example of the fuel injection timing and the ignition timing in the case of the third embodiment of the control method according to the present invention.

FIG. 18 shows another setting example of the temperature rise phase which is different from the temperature rise phase shown in FIG. 17B. In this example, the fuel injection is split into two times fuel injections. The first time and second time fuel injections are carried out at timings during the compression stroke. In addition, an interval T3" from the start timing of the second time fuel injection to the ignition timing is larger (wider) than an interval T1" from an end timing of the fuel injection to the ignition timing (shown in FIG. 17A) in the case of the super retard combustion. The ignition timing in this example of FIG. 18 is set after the compression top dead center and set toward the more advance angle side than the ignition timing in the case of the super retard combustion in the same way as the example shown in FIG. 17B.

Figure 19:
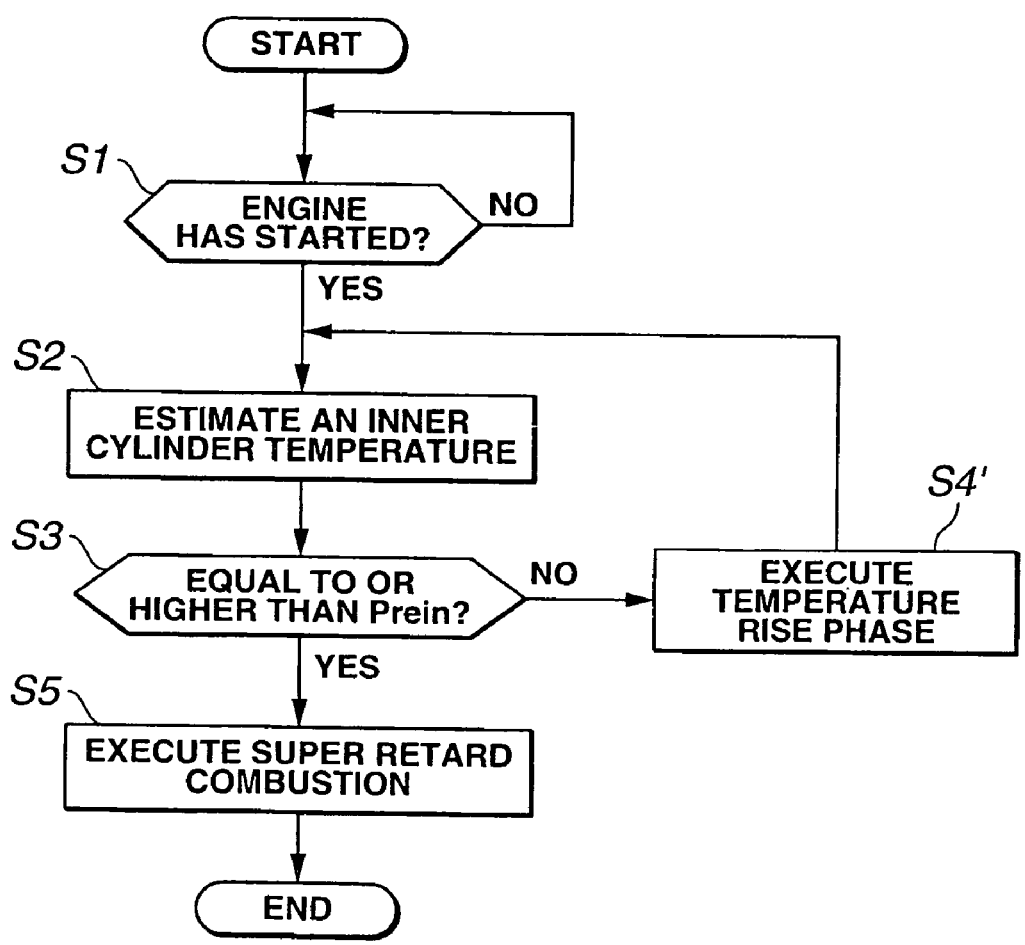
FIG. 19 is a flowchart representing an example of the combustion control executed in a case of the third embodiment according to the present invention.

FIG. 19 shows a flowchart representing a combustion control process to be executed during the cold start of engine 1. It is noted that the same step numbers in FIG. 18 as those shown in FIG. 6 are carried out in the same way as described with reference to FIG. 6 and the descriptions on the same step numbers are omitted herein. In FIG. 19, if control unit 25 determines that the inner cylinder temperature has not yet reached to predetermined temperature Prein, the routine goes to a step S4' at which control unit 25 executes the temperature rise phase. That is to say, during the interval of time at which the inner cylinder temperature has not yet reached to predetermined temperature Prein, control unit 25 executes the temperature rise phase described above. If control unit 25 determines that the inner cylinder temperature reaches to predetermined temperature Prein, the routine goes to step S5 at which the super retard combustion is carried out. It is noted that, although, the super retard combustion is adopted in the first example shown in FIG. 2, the second example shown in FIG. 2, or the third example shown in FIG. 2 may be used. In addition, the temperature rise phase at step S4' is not limited to that shown in FIG. 17B or that shown in FIG. 18 but may variously be set.

Figure 20:
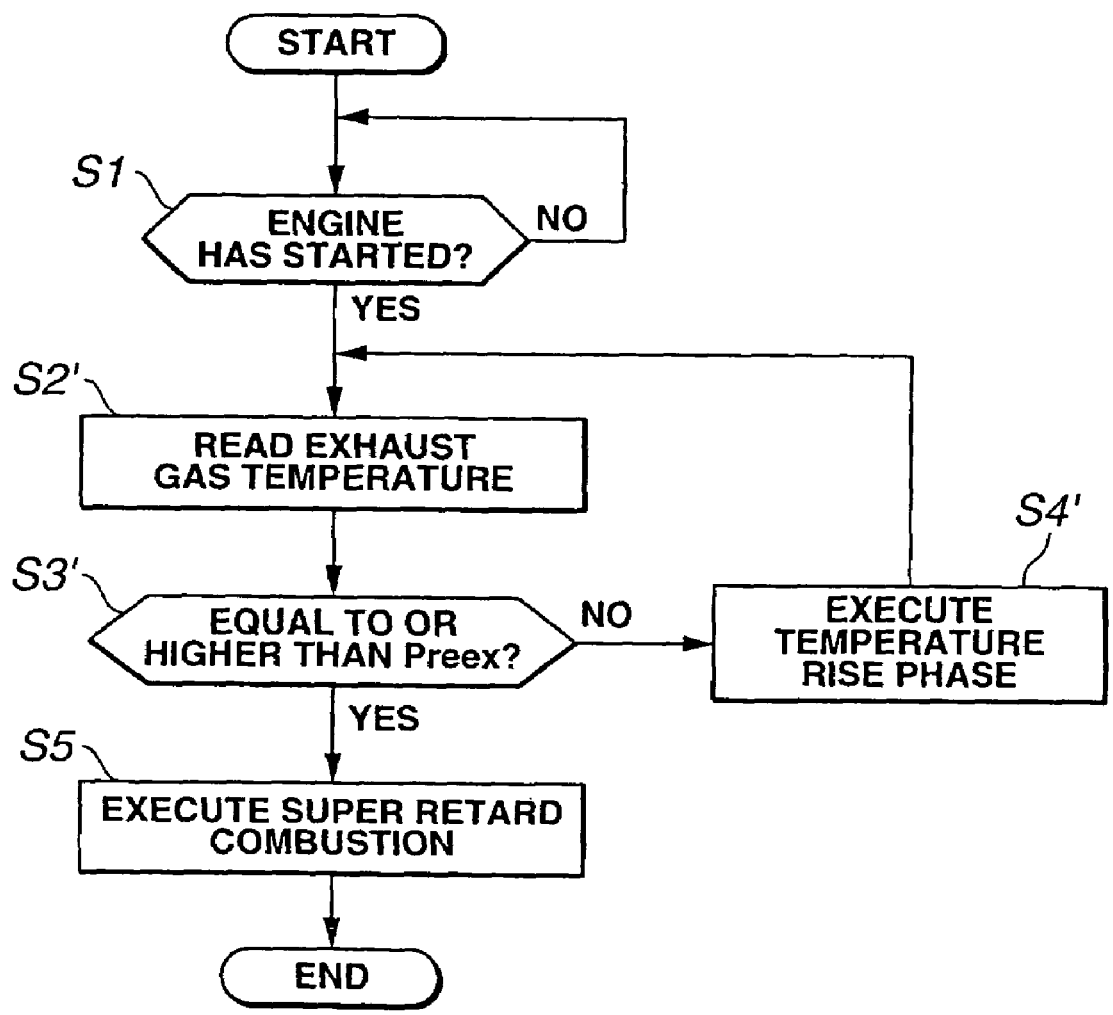
FIG. 20 is a flowchart representing another example of the combustion control executed in a case of the third embodiment of the control method according to the present invention.

FIG. 20 shows a flowchart representing another example of the definition of the interval of time during which the temperature rise phase is executed on the basis of the exhaust gas temperature. That is to say, immediately after the cold start of engine 1 in which the exhaust system temperature is low, the oxidation of HC in exhaust gas passage 5 is not sufficiently promoted and the unburned HC becomes easily and directly exhausted to the external of engine 1. However, when the exhaust gas temperature becomes higher to some degree, the unburned HC is oxidized within exhaust gas passage 5. The flowchart shown in FIG. 20 is similar to the example of the flowchart shown in FIG. 19. If control unit 25 determines that engine 1 has started, the routine goes to step S2' at which control unit 25 reads exhaust gas temperature. At step S3', control unit 25 determines whether the exhaust gas temperature has reached to predetermined temperature Preex. The exhaust gas temperature is gradually raised with the certain time constant after the start of engine 1 as shown in FIG. 9. In place of the direct detection by means of exhaust gas temperature sensor 13, the exhaust gas temperature may be estimated using the parameters such as the coolant temperature during the start of engine 1, the accumulated intake air quantity, the engine speed, and the load. Furthermore, in order to simplify the combustion control shown in FIG. 20, the mere passage time from the start of engine 1 may determine whether the exhaust gas temperature has reached to predetermined temperature Preex. If, at step S3', control unit 25 determines that the exhaust gas temperature has not yet reached to predetermined temperature Preex, the routine goes to step S4' at which control unit 25 executes the temperature rise phase described above until the exhaust gas temperature has reached to predetermined temperature Preex. If the exhaust gas temperature has reached to predetermined temperature Preex, the routine goes to step S5 at which control unit 25 executes the super retard compression.

Figure 21:
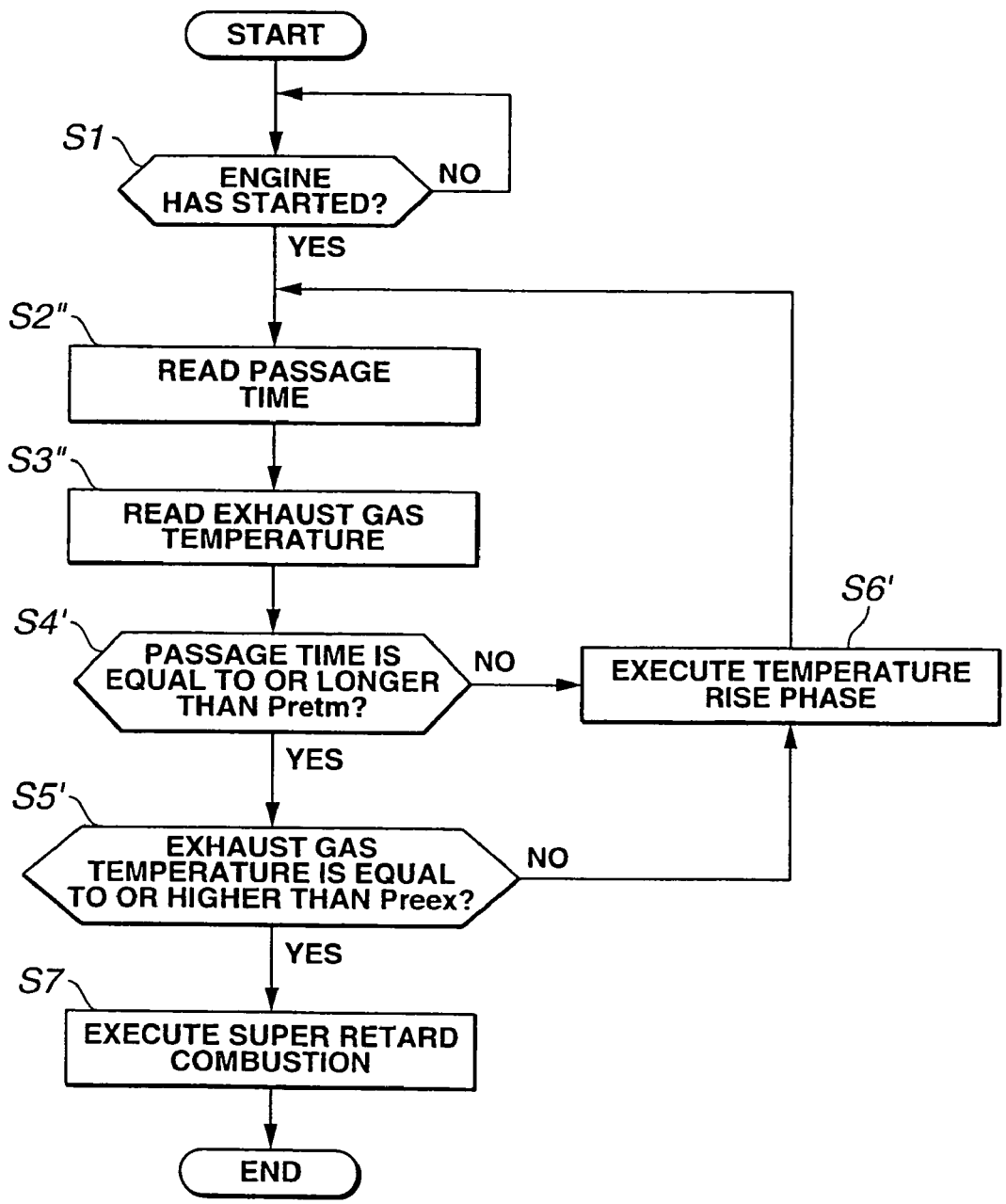
FIG. 21 is a flowchart representing a still another example of the combustion control executed in a case of the third embodiment according to the present invention.

Next, FIG. 21 shows a flowchart representing another example of the definition of the temperature rise with both of the inner cylinder temperature and the exhaust gas temperature taken into consideration. It is noted that, in this flowchart of FIG. 21, the inner cylinder temperature is indicated by merely indicating the passage time from the start of engine 1 and the exhaust gas temperature is directly detected by means of exhaust gas temperature sensor 13. These temperatures may be estimated using the parameter(s) described above. If, at step S1, control unit 25 determines that the cold start of engine 1 has occurred, the routine goes to step S2". At step S2", control unit 25 reads the passage time from the time point at which engine has started. At step S3", control unit 25 reads the exhaust gas temperature detected by exhaust gas temperature sensor 13. Next, at step S4', control unit 25 determines whether the passage time from the start of engine 1 has reached to predetermined time Pretm (this predetermined time corresponds to the time duration for which the inner cylinder temperature can reach to the inner cylinder temperature required for the fuel vaporization). Then, at step S5', control unit 25 determines whether the detected exhaust gas temperature has reached to predetermined temperature Preex (the temperature required for the oxidation of HC).

If, at step S4' or at step S5' shown in FIG. 21, control unit 25 determines that the passage time has not yet reached to predetermined time Pretm or the exhaust gas temperature does not reach to the predetermined temperature Preex, the routine goes to step S6'. At step S6', control unit 25 executes the above-described temperature rise phase. If the passage time from the time at which the cold start of engine 1 is carried out has reached to predetermined time Pretm and the exhaust gas temperature has reached to predetermined temperature Preex, the routine goes to step S7 at which control unit 25 carries out the super retard combustion. Although the super retard combustion has the three examples as shown in FIG. 2, any one of the three examples shown in FIG. 2 may be used in the flowchart of FIG. 21. It is noted that TDC described in FIGS. 2, 4A, 4B, 11A, 11B, 11C, 14, and 15 denotes the compression top dead center, BTC described therein denotes the bottom dead center, and each rectangular shape described therein represents the fuel injection quantity and start and end timings of the fuel injection.

This application is based on a prior Japanese Patent Application No. 2004-285590 filed on Sep. 30, 2004, a prior Japanese Patent Application No 2004-300993 filed on Oct. 15, 2004. and a prior Japanese Patent Application No. 2004-302341 filed on Oct. 18, 2004. The entire contents of these Japanese Patent Applications Nos. 2004-285590, 2004-300993, and 2004-302341 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A control method for a direct injection spark ignited internal combustion engine, the direct injection spark ignited internal combustion engine comprising: a fuel injection valve configured to perform a direct injection of fuel into an engine cylinder; and a spark plug, the control method comprising: executing a super retard combustion comprising an ignition through the spark plug at a timing after a compression top dead center and at least once fuel injection in which the injection of fuel is started at a timing after the compression top dead center and before the ignition, during a cold start of the engine; and inhibiting an execution of the super retard combustion for a predetermined interval of time immediately after the cold start of the engine.

2. A control method for a direct injection spark ignited internal combustion engine as claimed in claim 1, wherein, when the execution of the super retard combustion is inhibited, the fuel injection is carried out at a timing before the compression top dead center.

3. A control method for a direct injection spark ignited internal combustion engine as claimed in claim 2, wherein, when the execution of the super retard combustion is inhibited, the ignition is carried out at a timing before the compression top dead center.

4. A control method for a direct injection spark ignited internal combustion engine as claimed in claim 2, wherein, when the execution of the super retard combustion is inhibited, the ignition is carried out at a timing after the compression top dead center.

5. A control method for a direct injection spark ignited internal combustion engine as claimed in claim 4, wherein the ignition timing after the compression top dead center is set to be more advanced angle side than the ignition timing carried out during the execution of the super retard combustion.

6. A control method for a direct injection spark ignited internal combustion engine as claimed in claim 4, wherein an interval from a fuel injection start timing to the ignition timing is larger than an interval from the fuel injection start timing to the ignition timing carried out during the super retard combustion.

7. A control method for a direct injection spark ignited internal combustion engine as claimed in claim 1, wherein, when a combustion mode is transferred from the inhibiting of the execution of the super retard combustion to the super retard combustion, a temperature rise phase in which an ignition timing is set toward a more advance angle side than that of the super retard combustion is executed.

8. A control method for a direct injection spark ignited internal combustion engine as claimed in claim 7, wherein the fuel injection timing in the temperature rise phase is set to be more advanced angle side than the fuel injection timing carried out in the super retard combustion.

9. A control method for a direct injection spark ignited internal combustion engine as claimed in claim 7, wherein an interval from a fuel injection start timing to the ignition timing in the temperature rise phase is larger than the interval from the fuel injection start timing to the ignition timing carried out in the super retard combustion.

10. A control method for a direct injection spark ignited internal combustion engine as claimed in claim 1, wherein an ignition timing in the super retard combustion is set from 15° CA to 30° CA after the compression top dead center.

11. A control method for a direct injection spark ignited internal combustion engine as claimed in claim 1, wherein, in the super retard combustion, prior to the fuel injection at the time after the compression top dead center, a further fuel injection is carried out at a timing before the compression top dead center.

12. A control method for a direct injection spark ignited internal combustion engine as claimed in claim 1, wherein an air fuel ratio in the super retard combustion is a stoichiometric air-fuel ratio or slightly leaner than the stoichiometric air-fuel ratio.

13. A control method for a direct injection spark ignited internal combustion engine as claimed in claim 1, wherein the predetermined interval of time is defined on the basis of whether an inner cylinder temperature is lower than a predetermined temperature.

14. A control method for a direct injection spark ignited internal combustion engine as claimed in claim 1, wherein the predetermined interval of time is defined on the basis of whether an exhaust gas temperature is lower than a predetermined temperature.

15. A control apparatus for a direct injection spark ignited internal combustion engine, the direct injection spark ignited internal combustion engine comprising: a fuel injection valve configured to perform a direct injection of fuel into an engine cylinder; and a spark plug and the control apparatus comprising:

a super retard combustion executing section configured to execute a super retard combustion comprising an ignition through the spark plug at a timing after a compression top dead center and at least once fuel injection in which the injection of fuel is started at a timing after the compression top dead center and before the ignition, during a cold start of the engine; and an inhibiting section configured to inhibit an execution of the super retard combustion for a predetermined interval of time immediately after the cold start of the engine.

16. A control apparatus for a direct injection spark ignited internal combustion engine, the direct injection spark ignited internal combustion engine comprising:

a fuel injection valve configured to perform a direct injection of fuel into an engine cylinder; and a spark plug and the control apparatus comprising:

super retard combustion executing means for executing a super retard combustion comprising: an ignition through the spark plug at a timing after a compression top dead center; and at least once fuel injection in which the injection of fuel is started at a timing after the compression top dead center and before the ignition, during a cold start of the engine; and inhibiting means for inhibiting an execution of the super retard combustion for a predetermined interval of time immediately after the cold start of the engine.

\* \* \* \* \*